United States Patent

[11] 3,524,401

| [72] | Inventors | George W. Hosfield<br>Excelsior, Minnesota;<br>Lowell Armstrong, Louisville, Kentucky;<br>Bob K. Davis, Minneapolis, Minnesota |
|---|---|---|
| [21] | Appl. No. | 672,182 |
| [22] | Filed | Oct. 2, 1967 |
| [45] | Patented | Aug. 18, 1970 |
| [73] | Assignee | The Pillsbury Company<br>Minneapolis, Minnesota<br>a Corp. of Delaware |

[54] COMPOSITE REFRIGERATED DOUGH COMPOSITION
11 Claims, 7 Drawing Figs.

[52] U.S. Cl. .................................................. 99/90,
99/86, 99/172, 99/192
[51] Int. Cl. .................................................. A21d 8/02
[50] Field of Search ............................................. 99/172,
90, 90NF, 90NFS, 86, 192

[56] References Cited
UNITED STATES PATENTS

| 2,942,988 | 6/1960 | Erekson et al. ............... | 99/192 |
| 3,297,449 | 1/1967 | Baker et al. .................. | 99/90 |
| 3,438,791 | 4/1969 | Matz ........................... | 99/192 |

*Primary Examiner*— Lionel M. Shapiro
*Assistant Examiner*— James R. Hoffman
*Attorney*— Ronald E. Lund and James V. Harmon

ABSTRACT: A composite refrigerated dough product for making baked goods such as biscuits. It consists of a body of undeveloped dough at least partially enveloped in a layer of developed dough that prevents gas from escaping and allows the dough bodies to be handled, cut and packed.

Patented Aug. 18, 1970 3,524,401
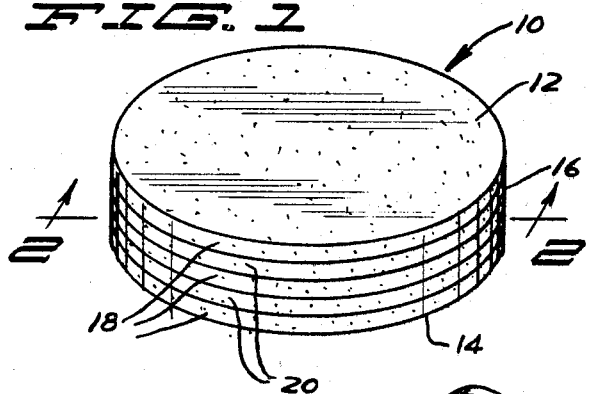
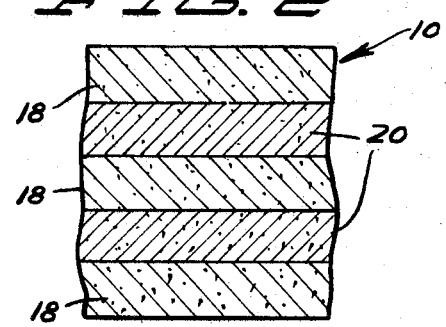
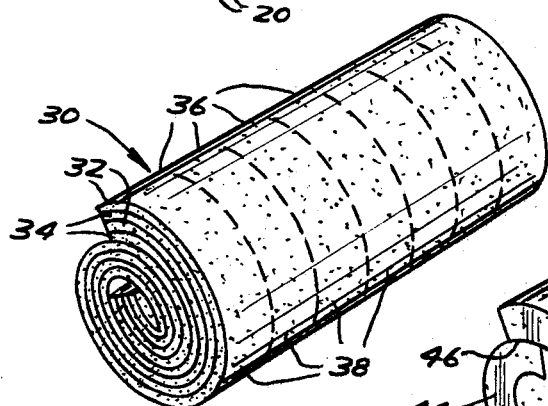
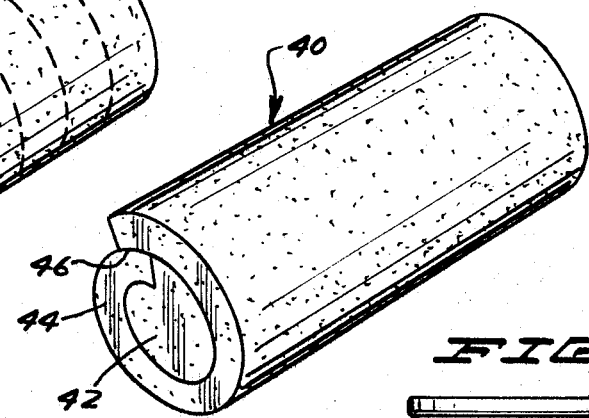
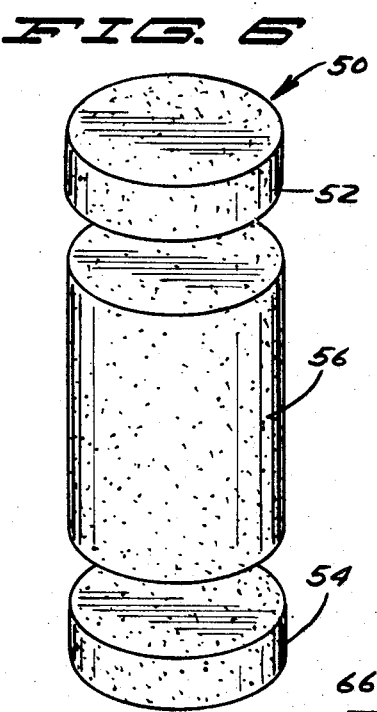
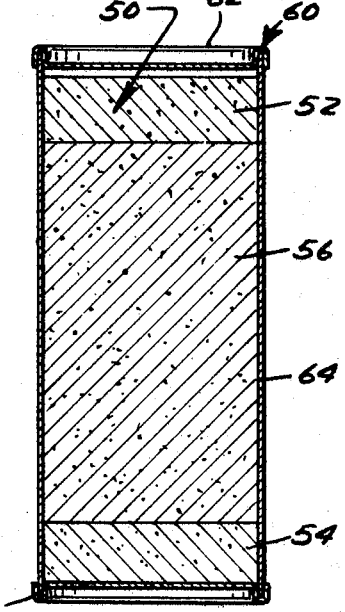
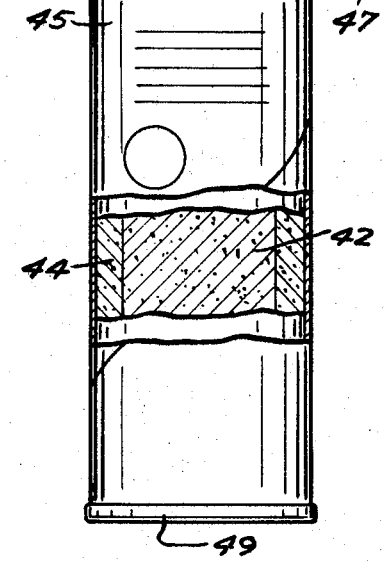
INVENTORS
GEORGE W. HOSFIELD
LOWELL ARMSTRONG
BY BOB K. DAVIS
ATTORNEY

COMPOSITE REFRIGERATED DOUGH COMPOSITION

The present invention relates to cereal-based food products and more particularly to packaged and refrigerated chemically leavened dough of the type which is used by the consumer for preparing rolls and biscuits. The invention relates more particularly to a packaged refrigerated dough composition in which two different kinds of refrigerated dough are united to form a composite structure.

Refrigerated unbaked biscuit dough of the type that is merchandised in pressure-retaining containers must be developed by mechanical agitation to a greater degree than biscuit dough that is used by the housewife if it is to successfully withstand distribution through warehouses and retail outlets without spoilage. Increasing the development of the dough has the disadvantage of causing the finished biscuits to become tough. Thus, one objective of this invention is to provide a packaged unbaked dough product which is similar in texture to biscuits produced by the homemaker, i.e. having a more tender texture and a higher volume. Another general objective of the invention is to make practical an unbaked refrigerated packaged dough product which has physical characteristics when baked similar to those found in undeveloped dough products prepared from batters, e.g. cakes and muffins, viz. a texture which is characterized by being crumbly and cake-like rather than being bread-like. When broken cakes and muffins tend to fall apart whereas bread remains held together. Although products prepared from undeveloped dough possess the desired qualities, the dough is difficult to handle with conventional processing equipment because of its fluid condition and surface tack.

Carbon dioxide produced by the leavening system used in conventional packaged biscuits escapes slowly from the dough and from the package. The escape of a sufficient volume of leavening gas produces certain deficiencies in the finished biscuits, the most notable being a loss of volume. While it is possible by working the dough for longer periods of time to improve its gas-retaining properties, this approach is not an acceptable one because of the toughness of the finished product that results from the additional mixing.

In previous attempts to produce biscuits that have a light, tender texture, it has been common to spread shortening over a sheet of dough and then fold the sheet one or more times to distribute the shortening between the dough layers. This approach is not entirely satisfactory, particularly for example when it is desirable to keep the fat content of the dough as low as possible. Moreover, shortening is relatively expensive by comparison with the dough itself. In addition, products prepared in this manner have flaky character in which the biscuits come apart in layers. On the other hand, it is often desirable to produce a biscuit having a homogeneous crumbly or easily friable structure.

A further deficiency of the prior refrigerated dough compositions was the severe restriction in the maximum amount of sugar that could be used due to the pasty or gummy character that the dough takes on when large amounts of sugar are used.

In view of the deficiencies of the prior art, it is one object of the present invention to provide a refrigerated dough composition having acceptable texture and chewing characteristics while at the same time having improved gas-holding properties.

A further object of the present invention is the provision of an improved refrigerated dough composition which upon being baked has a relatively tender, moist and crumbly texture but has handling characteristics that enable it to be transported as a sheet from which pieces can be punched and packaged with high speed automatic equipment.

Another object of the invention is the provision of an improved refrigerated dough composition having satisfactory, gas-holding properties and crumbly texture.

A further object of the invention is the provision of an improved refrigerated dough composition in which most of the dough present in the composition does not have that degree of resilience and strength which was previously regarded as being necessary for proper handling with high speed equipment.

A still further object of the invention is the provision of an improved refrigerated dough composition which is capable of having a relatively high sugar content.

Another object of the invention is the provision of an improved composite refrigerated dough composition which is capable of being formed and packed.

Another object of the invention is to provide a composite dough structure which makes possible different leavening systems in different portions of the dough composition without interfering with the gas retaining properties of the dough structure.

A further object of the invention is the provision of an improved dough composition which is capable of retaining leavening gas even when packaged in a gas pervious container.

Still another object of the invention is the provision of a refrigerated dough composition in which food particles other than dough can be readily incorporated into the composition.

These and other more detailed and specific objects will become apparent from the following description of the invention and drawings wherein:

FIGURE 1 is a perspective view of a food product prepared in accordance with one form of the invention.

FIGURE 2 is a greatly enlarged partial vertical sectional view of the food product of FIGURE 1.

FIGURE 3 is a perspective view of another form of dough product in accordance with the invention.

FIGURE 4 is a perspective view of another form of the invention.

FIGURE 5 is a side elevational view partly in section of the product of FIGURE 4 after being packaged.

FIGURE 6 is another form of dough product in accordance with the invention.

FIGURE 7 is a vertical sectional view of a can containing the dough product of FIGURE 6.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

In brief terms, the present invention is based upon the use of at least two different refrigerated dough compositions in a single heterogeneous composite dough body. One refrigerated dough composition consists of a relatively poorly developed or underdeveloped dough while the other consists of a more highly developed dough and the more highly developed dough is positioned to either wholly or partially enclose or envelope the poorly developed dough whereby the more highly developed dough acts as a sealing and protective matrix.

In this manner, separate functional requirements are placed upon the different portions of the dough system with the dough handling characteristics of the finished dough pieces being determined by the developed enveloping dough layer and the eating characteristics of the finished dough product being determined by the undeveloped center portion of the dough body.

As a first step in preparing compositions in accordance with the invention, a mass of dough is prepared as described, for example, in either Patents Nos. 2,942,988 or 3,297,449 or in the alternative any known formula for preparing a refrigerated, chemically leavened dough suited for packing in pressure-retaining containers that are to be distributed under refrigeration through retail distribution outlets.

In one suitable procedure, the following materials are assembled:

| Ingredients | Parts by weight |
| --- | --- |
| flour | 100 |
| shortening | 12.5 |
| chemical leavening agent | 4.4 |
| sugar | 4 |
| dried milk solids | 4 |
| water | 62 |
| salt | 2.5 |
| flavoring | .1 |

The above ingredients, exclusive of salt, leavening, shortening and water are introduced into a water-jacketed vessel such as a bench-type mixer and mixed for two minutes at 100 rpm. with a beater blade known as a 4-wing whip. The shortening is heated until melted and added to the mixing bowl. Mixing is continued for an additional five minutes. After addition of the shortening, water chilled to about 35°F. is passed through the water jacket of the mixing bowl. The term "flour" as employed herein is intended to refer to corn meal, corn flour and potato flour as well as grain flours. The preferred leavening acid for the developed dough is sodium acid pyrophosphate. The other ingredients are in an almost homogeneous condition. The mixer is then stopped and the blade is replaced with a dough-kneading blade known as a dough hook. Approximately 97% of the water chilled to about 32°F. or ice is then introduced into the mixing bowl and the mixer operated for about 2 minutes at 175 rpm. At the end of this time, the ingredients are in the form of a poorly or undeveloped dough and the mixing is stopped to permit introduction of the salt, leavening and remaining ice water. It is then reinitiated and continued for one minute at 175 rpm., uniformly distributing the newly added ingredients to the dough mass. The finished dough temperature is about 60°F.

The dough is then divided into two batches, one of which is processed further without additional mixing. The other is mixed for a substantially longer period of time and until it is relatively highly developed. The undeveloped dough is usually mixed for a total period of about 2 minutes and highly developed dough for a total period of about 8 minutes as will be described more fully hereinbelow.

It should be understood that the state of development of the dough is not entirely a function of the mixing time but is also dependent upon the composition, moisture content, mixing speed and blade design. Thus, where higher mixing speeds are employed, relatively shorter times are required for carrying the dough to a developed state. The term "developed" as used herein will mean a dough composition having a consistency curve which has reached a level above about 600 Brabender units. The term "undeveloped" dough will mean a dough composition having a consistency curve that has not reached a level of about 600 Brabender units. A developed dough can also be defined as one which is of a suitable composition and has had sufficient working to develop elasticity and a cell structure capable of efficiently retaining gas.

The resulting two batches of dough are then transferred to troughs and delivered to the sheeting line. There the dough is divided into pieces of approximately 35 to 40 pounds in weight and each piece is passed through a conventional dough break consisting of several sets of rollers which flatten the dough into sheets.

The rolled sheets are then placed on a series of endless belt conveyors and, if necessary, further rolls which form them into a continuous sheet of dough approximately 1/2 inch thick by 18 inches wide.

The formation of the composite dough structure in accordance with one form of the invention will now be described in detail with particular reference first to FIGURES 1 and 2. In FIGURES 1 and 2 is shown a body of dough indicated generally at 10, which when baked will form one biscuit. The dough body 10 is circular having a flat upper surface 12 and a flat lower surface 14 and having a cylindrical side surface 16. It is composed of a plurality of superimposed and aligned layers of developed dough 18 and undeveloped dough 20. In this instance the layers of developed dough 18 and of undeveloped dough 20 are of equal thickness. While fiber layers are shown, a product having 64 layers performed well.

The composite dough structure 10 can be formed in any convenient manner, either manually or by superimposing the sheets with automatic equipment. In the event automatic equipment is employed, this can be conveniently accomplished by placing a sheet from which the layer 20 is cut on a moving conveyor belt as a continuous endless sheet, thus continuously depositing each successive layer on top of the one immediately beneath it with the sheets of undeveloped dough alternating with those of developed dough. Once the sheets have been thus assembled, they are transferred to a sheet punching and can packing apparatus of any suitable known construction, for example, of the type shown in Patent No. 3,154,986. The dough bodies 10 can be cut with either a circular outline as shown in FIGURE 1 or a hexagonal outline as described in the patent. It will be noted that the layer of developed dough 18 forms the upper surface and partially encloses the undeveloped dough 20. The developed layers 18 enable the dough body 10 to be easily handled and assist in reducing the undesired escape of gas from the dough body 10 during storage and shipment.

An alternative method of assembling composite structures in accordance with the invention will now be described in connection with FIGURE 3. Shown in the FIGURE is a dough body 30 which consists of a convoluted roll of dough formed from a laminate consisting of a plurality of sheets of developed dough 32 and undeveloped dough 34 with the layer of developed dough 32 being outermost in the roll. The roll 30 is provided with a plurality of circumferentially extending and longitudinally spaced parallel perforations 36 which divide the roll into a plurality of bodies 38 that can be manually separated from one another just before the dough is to be baked.

The roll 30 can be formed in several ways, one of the simplest being to superimpose and continuously advance a plurality of alternate sheets of developed and undeveloped dough as described in connection with FIGURES 1 and 2. The superimposed layers are then perforated along the lines 36 by means of laterally spaced cutting blades. The superimposed perforated sheets are then cut transversely at uniform intervals and rolled up to form a convolute spiral as shown in FIGURE 3 with any well-known equipment used for this purpose and packed, for example, as described in patent No. 3,427,783.

The roll 30 is then packed in a suitable container such as a fiberboard can of the type shown in FIGURES 5 and 7. The top closure disk is placed on the can and crimped in place. The cans are then proofed for a sufficient period of time to enable the roll 30 to completely fill the can. They are then placed in refrigerated storage and distributed to retail sales outlets. When the product is to be consumed, the pieces 38 are separated from one another manually and baked. It will be noted that each spiral piece 38 is substantially enclosed by the developed dough layer 32 and that the developed dough layers 32 allow the composite structure to be handled with automatic equipment. Moreover, the encased dough which is characterized by having poor gas-holding properties is provided the ability to hold gas whereby it is capable of being preserved by the entrained gas over an extended period of time.

Refer now to FIGURES 4 and 5 which show another embodiment of the invention. This form of the invention consists of a cylindrical roll 40 formed from a layer of developed dough that is sealed to itself along a longitudinally extending lap joint 46 around a central body 42 composed of undeveloped dough.

The roll 40 can be formed in any one of several ways. One of the most convenient is to form a sheet 44 as described hereinabove in connection with FIGURES 1 and 2. The sheet 44 is continuously conveyed at a constant rate upon the upper surface of an endless conveyor. As the sheet 44 is moved continuously by the conveyor, the undeveloped dough 42 is deposited as an elongated cylinder at the center of the continuously moving sheet with its side edges parallel to the sides of the sheet 44. Suitable folding blades or ploughs can be used to engage the sides of the sheet 44 and to turn them upwardly and centrally so that one edge thereof falls under the other edge thus forming the longitudinally extending lap joint 46. The roll formed continuously in this manner is then cut at uniformly spaced intervals to produce the structure shown in FIGURE 4. The rolls 40 are then placed in a suitable container such as a fiberboard can 45 as shown in FIGURE 5. The can ends 47 and 49 are crimped in place. It can be seen that the undeveloped dough body 42 is almost completely enveloped by the developed dough layer 44 during the cutting and packing operations as well as following the packing operation thereby greatly improving the handling characteristics of the dough bodies 40. Moreover, the escape of leavening gas from the undeveloped dough 42 will be substantially retarded due to the presence of the developed dough layer 44.

Refer now to FIGURES 6 and 7 which illustrate another embodiment of the invention. In FIGURE 6 is shown a dough body 50 which consists of developed dough layers 52 and 54, the height of each being relatively small by comparison to its diameter. Between the developed dough layers 52 and 54 is a cylinder 56 of undeveloped dough. The height of the undeveloped dough layer 56 is large compared with its diameter. The developed dough layers 52 and 54 are placed at each end of the undeveloped dough layer 56 to form a single composite cylinder. The container 60 includes the top closure element 62, a tubular center portion 64 and a bottom closure element 66. The bottom closure is attached prior to inserting the dough body 50. The top closure 62 is then placed in position and crimped to the end of the center portion 64. In the alternative, the dough body 50 can be punched from a relatively thin sheet as by means of a machine similar to that shown in Patent No. 3,154,986, and deposited first within the container 60. The dough body 56 can then be inserted above the dough body 54 and finally the dough body 52 is inserted. In this manner, the composite dough body 50 is not completely formed until assembled in the container 60.

It can be seen that the invention provides a heterogeneous dough system consisting of a highly developed dough and a less highly developed dough, the latter being at least partially enclosed by the developed dough.

The ratio of the weight of the undeveloped dough to developed dough can be varied providing a sufficient amount of developed dough is present to enable the undeveloped dough to be handled. It was found that ratios between about 1:4 and 4:1 can be employed and composite structures containing developed and undeveloped dough in these ratios by weight proved satisfactory.

The invention will be better understood by reference to the following example.

EXAMPLE I

A composite dough product was made in accordance with the invention using the following formulas for developed and undeveloped dough. Numerals represent parts by weight.

|  | Developed dough | Undeveloped dough |
| --- | --- | --- |
| Flour | 50.7 | 45.0 |
| Water | 27.4 | 22.1 |
| Emulsified shortening | 5.5 | 16.5 |
| Egg yolk | 2.0 | 2.0 |
| Sugar | 10.0 | 10.0 |
| SAPP | 1.5 | 1.5 |
| Soda | 1.1 | 1.1 |
| Salt | 1.8 | 1.8 |
| Total | 100.0 | 100.0 |

The components listed above under Developed Dough were mixed in a two-stage process in which flour and water are mixed in a first-stage to develop a gluten to a stage where it is extensible, elastic and exhibits gas retention properties. This is conveniently done by placing the flour and water in a mixing vessel of conventional and well-known type and mixing the dough with a bladed paddle for a period of about 2 - 5 minutes. Following this initial mixing period, the remaining ingredients are added and the dough is mixed for a sufficient period of time to make the mass homogeneous.

The components listed above under Undeveloped Dough are mixed together in a single stage mixing operation in which all of the ingredients are added together and mixed until homogeneous in a relatively short period of time, e.g., less than 2 minutes.

The developed and undeveloped dough were rolled into sheets and assembled to form composite dough structures in accordance with FIGURES 1 - 7. The developed dough was found to be highly effective in preventing the escape of leavening gas from the undeveloped dough mass. Moreover, it rendered the composite dough structure capable of being handled with conventional dough sheeting and cutting equipment.

It is apparent that many modifications and variations of this invention as hereinbefore set forth may be made without departing from the spirit and scope thereof. The specific embodiments described are given by way of example only and the invention is limited only by the terms of the appended claims.

We claim:

1. A composite refrigerated dough composition comprising in combination a body of undeveloped dough and an outer layer of more highly developed dough at least partially enveloping the undeveloped dough.

2. The composition of Claim 1 wherein the undeveloped dough comprises the uniform mixture of flour, shortening, leavening agent and water which is mixed for a total time of less than about 3 minutes and the developed dough layer comprises a mixture of flour, shortening, leavening agent and water which is mixed for at least about 5 minutes.

3. The composition according to Claim 1 wherein the developed and undeveloped dough is distributed throughout said dough body and has a plurality of alternate contacting layers of substantially uniform thickness.

4. The composition according to Claim 3 wherein the dough body formed from alternate layers of developed and undeveloped doughs rolled up upon itself to form a convoluted, elongated, cylindrical dough body.

5. The composition according to Claim 4 wherein a plurality of substantially parallel, transversely extending perforation lines are provided to divide the dough body into a plurality of manually separable pieces.

6. The composition according to Claim 1 wherein the dough body consists of an elongated cylinder of undeveloped dough enclosed within a relatively thin layer of developed dough extending to the end of the undeveloped dough cylinder and the cut ends of the undeveloped dough cylinder being exposed at each end of the dough body.

7. The composition according to Claim 1 wherein the composite dough body comprises an elongated cylinder of undeveloped dough having a cylindrical side surface, a pair of flat end surfaces and a relatively thin layer of developed dough positioned in engagement with each of the end surfaces of the undeveloped dough cylinder.

8. A process of forming a composite refrigerated, packaged dough composition comprising the steps of preparing a mass of developed dough, preparing a mass of undeveloped dough, forming the masses into developed and undeveloped sheets, superimposing the developed and undeveloped sheets in alternate layers and cutting entirely through the sheet to subdivide the sheet into pieces composed of alternate layers of developed and undeveloped dough.

9. The process according to Claim 8 wherein the pieces of dough formed from layers of developed and undeveloped dough is rolled up upon itself to form a spiral roll.

10. The process according to Claim 8 wherein a plurality of parallel, longitudinally spaced, transversely extending cuts are provided in the dough body extending through all of the layers thereof whereby the rolled up dough body can be separated manually into pieces.

11. A process for forming a composite refrigerated, packaged dough composition comprising admixing flour, shortening, a chemical leavening agent, water and flavoring with the mixing being carried out for a sufficient period of time to bring the dough to a developed state, admixing flour, shortening, a chemical leavening agent, water and flavoring with insufficient mixing to bring the dough to a developed state thereby providing developed and undeveloped dough bodies, forming the developed dough body into a relatively thin sheet, forming the undeveloped dough body into an elongated, cylindrical body, causing the developed dough sheet to envelope and enclose the undeveloped dough cylinder, subdividing the composite structure at uniformly spaced intervals along its length to provide separate bodies of dough.